Figure 1:
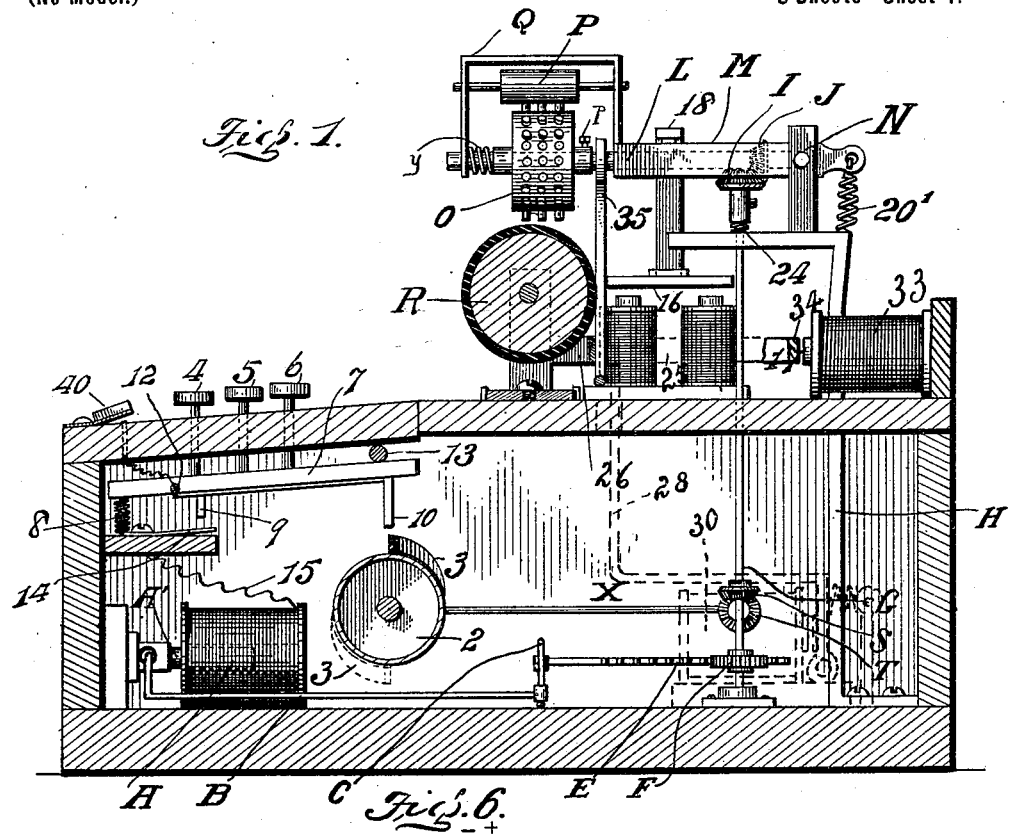

No. 681,957. Patented Sept. 3, 1901.
G. H. ENNIS.
ELECTRIC TYPE WRITER.
(Application filed Mar. 24, 1900.)
(No Model.) 5 Sheets—Sheet 1.

Witnesses
E. W. Hart.
Ralph H. Warfield.

Inventor
George H. Ennis.
by Rhesa H. Baird & Co.
his Attorneys.

No. 681,957. Patented Sept. 3, 1901.
G. H. ENNIS.
ELECTRIC TYPE WRITER.
(Application filed Mar. 24, 1900.)
(No Model.) 5 Sheets—Sheet 2.

Witnesses
E. W. Hart.
Ralph H. Warfield.

Inventor
George H. Ennis
by Rhesa & Boust Co.
his Attorneys

No. 681,957. Patented Sept. 3, 1901.
G. H. ENNIS.
ELECTRIC TYPE WRITER.
(Application filed Mar. 24, 1900.)

(No Model.) 5 Sheets—Sheet 3.

Witnesses
E. W. Hart.
Ralph S. Warfield.

Inventor
George H. Ennis
by Rhesa L. O'Brien
his Attorneys

No. 681,957. Patented Sept. 3, 1901.
G. H. ENNIS.
ELECTRIC TYPE WRITER.
(Application filed Mar. 24, 1900.)
(No Model.) 5 Sheets—Sheet 4.
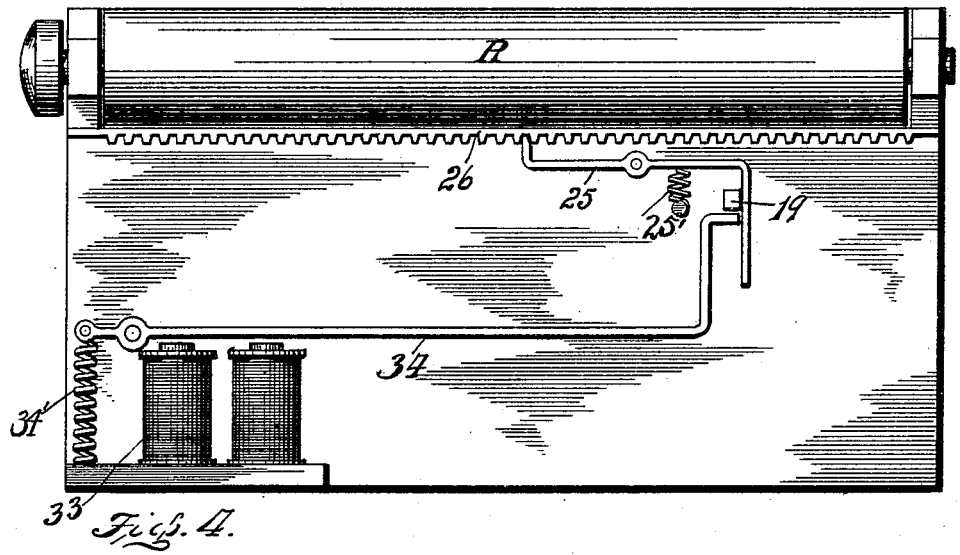
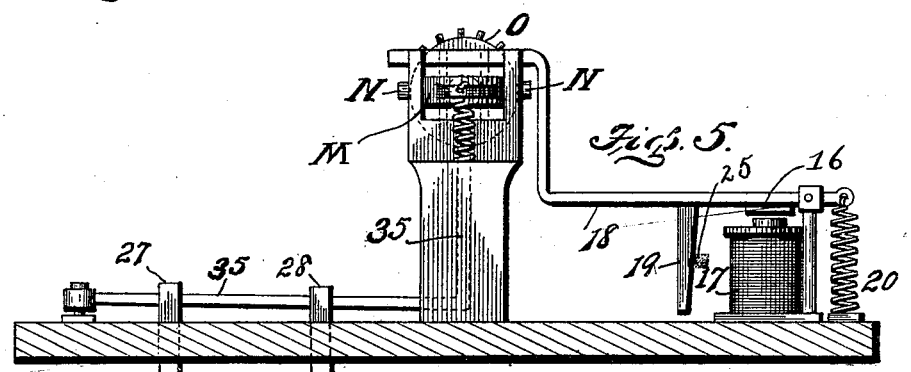
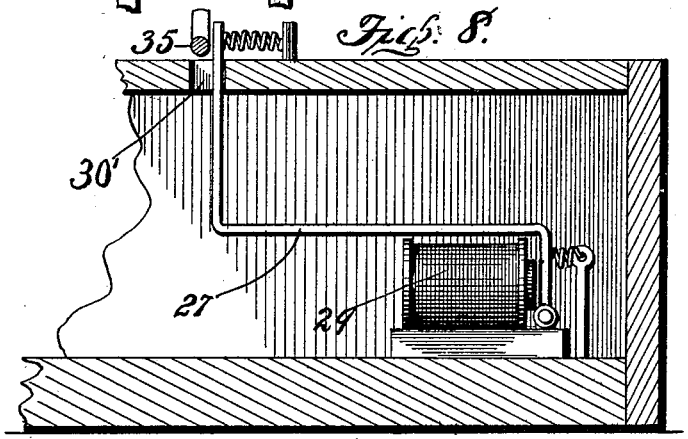
Witnesses
E. W. Hart.
Ralph S. Warfield.
Inventor
George H. Ennis.
by Chas. D. Boist Co.
his Attorneys No. 681,957. Patented Sept. 3, 1901.
G. H. ENNIS.
ELECTRIC TYPE WRITER.
(Application filed Mar. 24, 1900.)
(No Model.) 5 Sheets—Sheet 5.

Witnesses
E. W. Hart.
Ralph S. Warfield.

Inventor
George H. Ennis.
by Chisel & Bias & Co.
his Attorneys

THE NORRIS PETERS CO., PHOTO-LITHO., WASHINGTON, D. C.

UNITED STATES PATENT OFFICE.

GEORGE H. ENNIS, OF TROY, NEW YORK, ASSIGNOR, BY MESNE ASSIGN-
MENTS, TO ELECTRIC TYPEWRITER COMPANY, OF BUFFALO, NEW
YORK.

ELECTRIC TYPE-WRITER.

SPECIFICATION forming part of Letters Patent No. 681,957, dated September 3, 1901.

Application filed March 24, 1900. Serial No. 10,059. (No model.)

*To all whom it may concern:*

Be it known that I, GEORGE H. ENNIS, a citizen of the United States of America, residing at Troy, in the county of Rensselaer and State of New York, have invented a certain new and useful Electric Type-Writer, of which the following is a specification.

My invention relates to that class of typewriters in which a rotary type-wheel is rotated by mechanical devices in which electricity is employed as the motive power.

The distinguishing feature between my invention and others previously invented consists in the fact that in my invention the type-wheel is rotated to the desired letter or character by one electrical impulse, then held in this position fixedly and the letter or character impressed upon the paper on the roll of the paper-carriage by suitable mechanical means, also actuated by electricity, after which the type-wheel instantly returns to its first position.

My invention will insure the highest speed obtainable by the application of the human fingers on the respective keys, will relieve the operator largely of all mechanical work, as it requires but a slight touch of the fingers on the respective keys to actuate the typewriter, impresses the type in a uniform manner, and reduces the noise connected with its operation to the lowest point.

With these objects in view my invention consists in the peculiar arrangement, construction, and combination of parts, which will be more fully described hereinafter and particularly pointed out in the claims.

Figure 6:
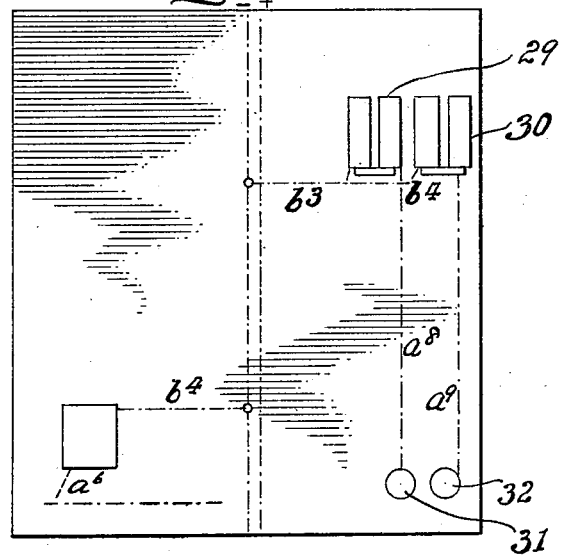
Figure 2:
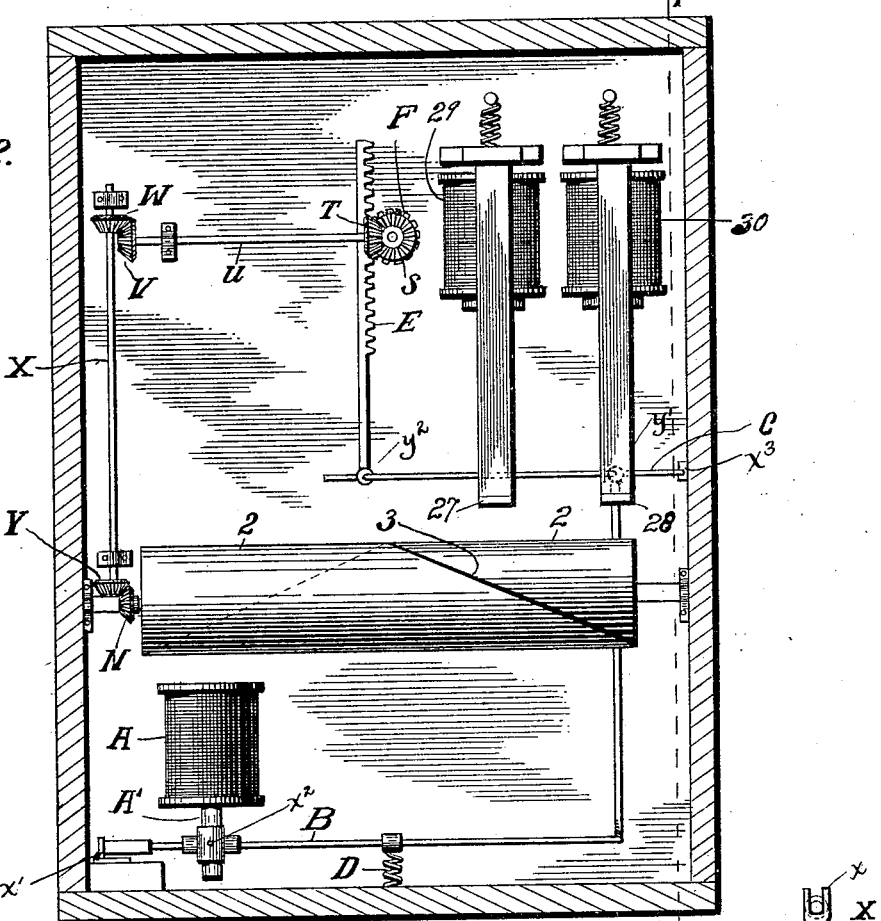
Figure 9:
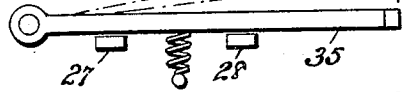
Figure 10:
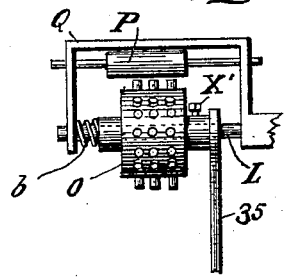
Figure 11:
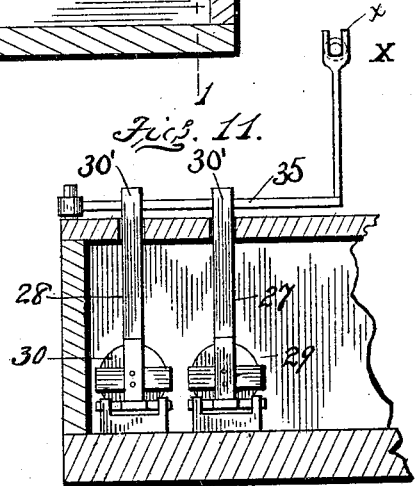
Figure 3:
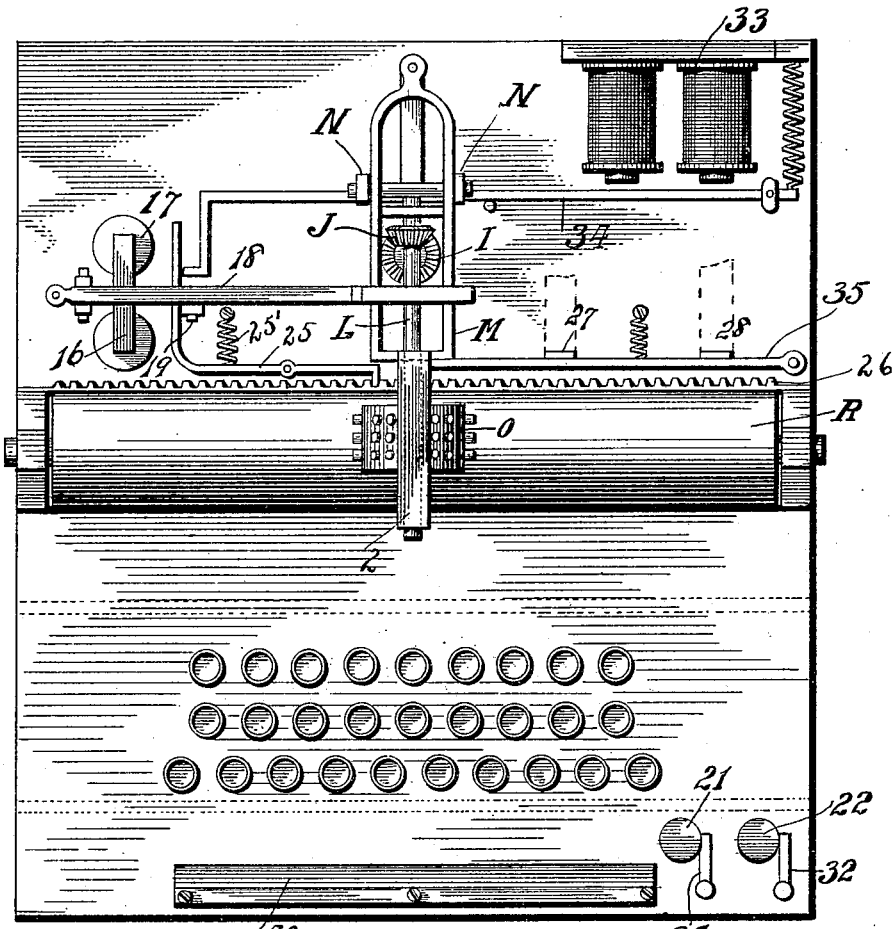
Figure 7:
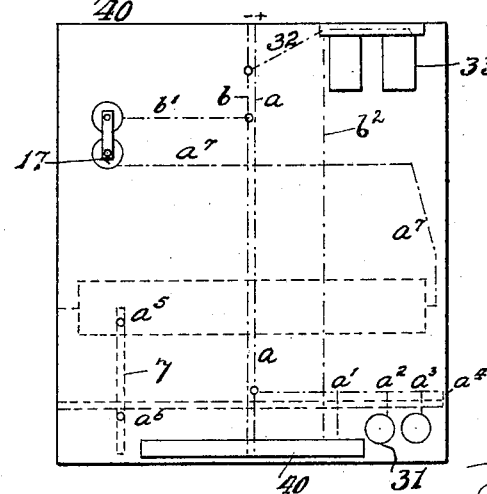
Figure 12:
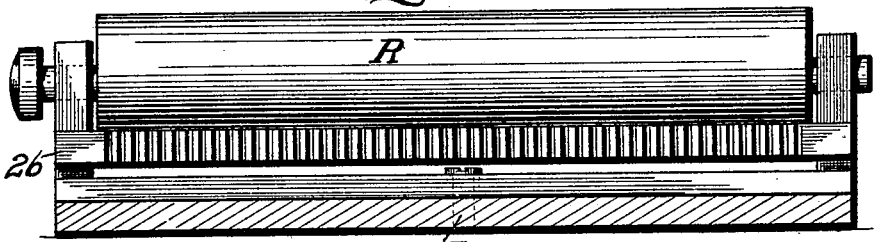
Figure 13:
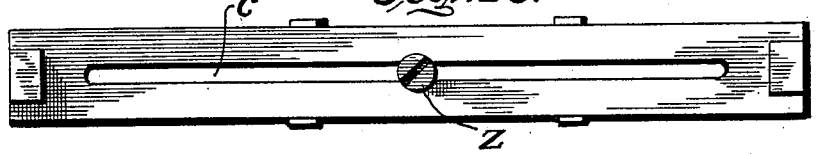
Figure 14:
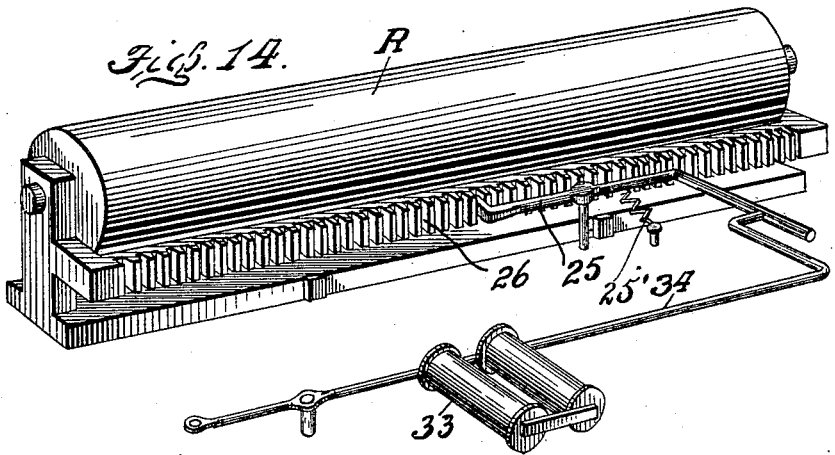
Figure 15:
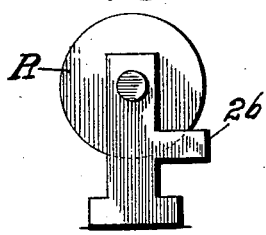

In the accompanying drawings, Figure 1 is a cross-section of my machine on line 1 1 of Fig. 2. Fig. 2 is a horizontal sectional view of the interior mechanism of my machine. Fig. 3 is a top plan view. Fig. 4 is a detailed view of the spacing device. Fig. 5 is a detailed view of the printing device, also of the shifting device. Figs. 6 and 7 are diagrams of the electric currents, and Figs. 8, 9, 10, 11, 12, 13, 14, and 15 are enlarged details.

A is an electromagnet, preferably of the solenoidal construction, the armature A' of which is suitably connected with the lever B, and the latter with the lever C, Fig. 2. Lever B is pivoted at $x'$ and pivotally connected with armature A' at $x^2$. Lever C is pivotally connected with the frame at $x^3$, and it is actuated by a sleeve $y'$, which is pivoted to the inner end of lever B and has sliding connection with lever C. Rack E is similarly pivoted to and has sliding connection with lever C, and in this way positive rotary motion is imparted to shaft G with each electrical impulse. A spring D, Fig. 2, operates to return the levers to their normal positions on the cessation of the electric current. The lever C moves a rack E, Figs. 1 and 2, which in turn operates the spur-gear F, Fig. 1, on the vertical shaft G, suitably supported in the frame H. On the upper end of shaft G is a bevel-gear I, Figs. 1 and 3, which meshes into the miter bevel-gear J, Figs. 1 and 3, on the type-wheel shaft L. Shaft L is supported in the frame M, which is fulcrumed in the support N. (See Fig. 3.)

O is the type-wheel, which preferably has three rows of letters or characters on its periphery, it being keyed or otherwise secured on shaft L.

P, Fig. 1, is the inking-roller, running in contact with the type-wheel O, inking the latter, and it is supported in a frame Q, secured to frame M.

R is the usual paper-roll on the ordinary carriage of a type-writer and supported by a frame which moves to and fro, as usual, and is held in position by the screws $z\ z$, working in the slot $c$ in the bottom of the frame.

26 is a rack attached securely to the frame of the paper-roll R.

25 is a dog acting on the rack 26, the paper-roll frame being given a positive forward step-by-step movement by the cam action of dog 25 against the rack-teeth successively with each downward stroke of a key-lever or the spacing mechanism.

On the vertical shaft G is a bevel-gear S, which meshes into the miter-gear T on the horizontal shaft U, Fig. 2. V is a bevel-gear on the opposite end of shaft U and meshing into the miter bevel-gear W on the shaft X.

Y is a bevel-gear on the forward end of shaft X and meshing with the miter bevel-gear N, mounted on the shaft of the cylinder 2. On the periphery of this cylinder is a helicoidal contact-strip 3, preferably of a non-conducting material, Figs. 1 and 2, or a series of pins or plates may be used in lieu thereof, disposed in the same general manner as the strip. Of course the material of the cylinder and the strip might be reversed accordingly as it may be desired to make or break the electric circuit. The cylinder 2 is of a light material and in the construction illustrated the periphery is of metal, the object of which construction will be explained hereinafter.

4, 5, and 6 are keys attached to the key-levers 7 7, only one of which levers is shown, as all of the key-levers are of identical construction.

8 is a spring attached to the key-lever. On the under side of the key-lever are the projecting pins 9 and 10.

12 is a metal rod passing through the key-levers and connecting with one pole of an electric battery.

13 is stop over the tops of the key-levers.

14 is a strip of sheet-brass suitably supported and connected with the electric magnet A by a wire 15.

17, Figs. 3 and 5, is an electromagnet mounted as usual, the armature 16 of which has the bar 18 extended and resting on the type-wheel frame M, Fig. 5.

19, Figs. 3, 4, and 5, is a leg extending down from bar 18, one side of which is wider than the other and operates the dog 25 when the latter by the cam action upon the teeth on the track 26 moves the paper-carriage as usual. When the bar 18 is drawn down by the attraction of the magnet 17, the tapering side of the leg 19, attached to one side of bar 18, passing down, engages one side of the dog-lever 25 and throws the dog out of the teeth of rack 26. The dog may be single or double. When the circuit through magnet 17 is broken, the bar 18 will resume its position, spring 20 causing this return of the bar. As the bar 18 rises the tapered leg 19 will release the dog-lever 25 and the spring 25' of the dog-lever will force the dog into the teeth of the rack 26 and the latter will advance the space of one tooth forward. When it is desired to move the rack 26 forward by the space-bar, a slight pressure on the space-bar 40 will close the electric circuit in which is included the magnet 33, by which the armature-lever 34 will act on the dog-lever 25 and throw out the dog. Upon the cessation of the electric current the spring 34' on the dog-lever will act and force the rack 26 forward one tooth.

35 is a lever, Figs. 1, 3, and 5, which when operated upon by levers 27 and 28, connected with the electromagnets 29 and 30, shifts the type-wheel endwise as required.

21 and 22 are shift-keys—figures and capitals.

31 and 32, Fig. 3, are latches to fasten the shift-keys when required.

40 is the spacing-bar, which when pressed upon makes an electrical connection and operates the electromagnet 33, Figs. 3 and 4, which in turn operates the lever 34 and the dog mechanism and the rack for moving the paper-roll. These electromagnets 29 and 30 have each armature-levers 27 and 28, extending horizontally over the top of each of the electromagnets 30 and 29, thence vertically up through an opening in the top of the frame, as shown at 30' in Figs. 8 and 11, where each of them rests against the horizontal lever 35, which latter extends up vertically and terminates in a fork $x$, as shown, partially encircling the type-wheel shaft I and resting against the hub of the type-wheel O. If now the electric circuit is closed by pressing on either of the switch-keys 31 and 32, Fig. 3—for instance, 32—the electromagnet 30 will be energized, and the armature-lever 28, operating against the horizontal lever 35, will by its fork acting on the hub of the type-wheel O push the type-wheel a certain distance, as shown. As will be seen, the lever 27 will push the type-wheel the distance of two rows of letters and the lever 28 the distance of one row of letters, &c., on the type-wheel O. As the distance the armature moves is the same on each of the electromagnets 30 and 29, the nearer the levers 27 or 28 act toward the fulcrum the longer the sweep of the lever 35. It will be noticed that the type-wheel hub is fastened to the type-wheel shaft by a little pin $p$, which permits by the pin working back and forth in a slot a side or lateral motion of the type-wheel, but holds the type-wheel secure on the shaft. There is also a spring $y$ on the type-wheel shaft shaft near the outer end, which returns the type-wheel to its first position when the pressure from the lever 35 is removed by breaking the electric current on the electromagnets 30 and 29.

To indicate the circuits, I have made two diagrams. $a$ and $b$ are the two battery-wires. $a'$ is the connection on one side with the spacer-closer, $a^2$ and $a^3$ with the switch-keys, and $a^4$ with the rod passing through the key-bars. $a^5$ is the connection made when the pin 10 is pressed down on stop-cylinder 2. $a^7$ is the continuation of the circuit with the printing-magnet 17. $a^6$ is the connection when the pin 9, pressing on the brass spring 14, connects with one side of the solenoid-magnet. $b'$ is the wire connection on the other pole of the printing-magnet 17. $b^2$ is the wire connection on the other side of the spacing-magnet 35. The wiring diagram shown in Fig. 6 illustrates the connection between the switch-keys 31 and 32 and magnets 29 and 30. $b^3$ and $b^4$ are the connections on the other side of magnets 29 and 30. This is about as simple an arrangement of circuits as can be made; but they may be differently arranged and perhaps better.

Having described the different mechanical features of my invention, I will now proceed to explain its operation.

Upon the depression of the key 4 the key-lever 7 will be depressed and as the pin 10 is longer than the pin 9 will descend, so as to intercept the helicoidal contact-strip on the stop-cylinder 2. As the helicoidal strip encircles the cylinder 2, beginning at one end and ending at the other, it divides the cylinder into an equal number of parts and as many as there are letters or characters on each of the rows of letters or characters on the type-wheel. As the key-lever 7 is further depressed the pin 9 touches the brass strip 14, closing the electric current through the rod 12, pin 9, and the electromagnet A, which causes the levers B and C to move the rack E and the latter the gear on the vertical shaft G; also, the bevel-gear I and the miter-gear J on the type-wheel shaft L and the type-wheel O. Thus the depression of any of the key-levers, of which there are as many as the letters or characters in each row on the type-wheel O, by one electric impulse will cause an entire rotation of the type-wheel O, as the length of motion of the rack E is equal to the circumferential surface of the spur-gear F and the gears I and J are of the same diameter. The keys and key-levers are arranged on the keyboard in the same order as the letters or characters on the type-wheel O. To stop the type-wheel O at any desired point or letter, the pin of the depressed key will allow the stop-cylinder 2 to rotate until the helicoidal contact-strip 3 reaches the pin 10. As the vertical shaft G is connected, as explained above, by gears and shafts with the stop-cylinder 2, the type-wheel O will also stop and be held by the force of the electromagnet in this fixed position. When the pin 10 reaches the surface of the stop-cylinder 2, an electric contact will be made and the current closed in which the electromagnet 17 is included and the arm 18 will be forced down upon the frame M, which is fulcrumed at N, and thus impress the type-wheel O upon the paper on the paper-roll R. The type-wheel is inked by running in contact with the ink-roll P. Leg 19 on the arm 18 on its depression will operate the dog and rack mechanism and move the paper-roll the required distance, as is usually done. The helicoidal stop-strip on the stop-cylinder 2 may be made of any non-conducting material, or it may be of metal, to insure lightness, and the inner edge faced with thin rubber, as shown in Fig. 1. In this way the electric contact of pin 10 will not be made until it reaches the metallic surface of the stop-cylinder 2. To allow the contact-pin 9 to descend farther, the brass strip 14, on which the pin 9 presses, is made of spring-brass. The gear I, meshing into the miter-gear J, rests upon a spring 24 and is movable on a feather on the vertical shaft G. This permits the two gears to retain their connection when the frame M is forced down. Upon the removal of the operator's finger from the key depressed the circuit of the printing-electromagnet 17 will be broken, the arm 18 will be raised by its spring 20, thus releasing the type-wheel frame M, and by its spring resume its first position. At the same time the circuit of the working magnet A will be broken and by the levers B and C and their connected shafts and gears by the action of the spring D will rotate the type-wheel back to its initial position.

Having thus described my invention, what I claim as new, and desire to secure by Letters Patent, is—

1. In a type-writer, a type-carrier rotated to the desired point by a single impulse, a spirally-arranged stop for causing the carrier to cease its movement at the desired character, and means for vibrating the carrier for causing the impress of said character upon the paper carried upon the paper-roll.

2. In a type-writer, a type-carrier rotated to the desired point by a single impulse, a spirally-arranged stop for causing the carrier to cease its movement at the desired character and means for vibrating the carrier for causing the impress of said character upon the paper carried by the paper-roll and means for shifting the type-wheel endwise.

3. In a type-writer, a type-wheel revolubly supported and adapted to be rotated to the desired point by an electric impulse, a key-lever in electrical connection with mechanism for rotating, sliding and vibrating said wheel and a revolubly-supported spirally-arranged contact strip or abutment for causing the type-wheel to cease its rotary movement at the desired character preparatory to the lateral swing of the wheel to impress the character upon the paper to be printed.

4. In a type-writer, a type-carrier which is shifted axially, longitudinally and bodily and then held fixedly by a single electric impulse until an imprint of the predetermined character is made upon the paper after which the carrier instantly returns to its first position preparatory to the imprinting of another character.

5. In a type-writer, a type-carrier shifted to the desired character preparatory to an imprint by suitable actuating means, a movable stop which moves and rests simultaneously with the type-carrier, and key-levers operating in connection with the stop.

6. In a type-writer, a type-carrier shifted to the desired character preparatory to an imprint by suitable actuating means, a spiral rotatable stop which moves and rests simultaneously with the type-carrier, and key-levers operating in connection with the stop.

7. In a type-writer, a type-carrier shifted to the desired character preparatory to an imprint by a single electric impulse, a spiral rotatable stop which moves and rests simultaneously with the type-carrier, and key-levers operating in connection with the stop.

8. In a type-writer, the combination with a rotary type-wheel, a key-lever and electric means for rotating the wheel, shifting it axially and swinging it laterally, of a spirallydisposed contact strip or abutment mechanism for stopping the rotation of the type-wheel at a predetermined character.

9. In a type-writer, the combination with a rotary type-wheel, a key-lever and electric means for rotating the wheel, shifting it axially and swinging it laterally, of stop mechanism consisting of a cylinder having on its periphery a helicoidal contact adapted to be engaged by a projection on the key-lever for stopping the rotation of the wheel at a predetermined point.

10. In a type-writer, the combination with a rotary type-wheel, a key-lever and means for rotating the wheel, shifting it axially and swinging it laterally, of stop mechanism consisting of a cylinder having on its periphery a helicoidal contact adapted to be engaged by a projection on the key-lever for stopping the rotation of the type-wheel at a predetermined point, and gearing set in motion by the key-lever for communicating motion to the type-wheel and the cylinder.

11. The combination with a type-wheel and electrical means for turning said wheel, shifting it axially and swinging it laterally of a key-lever for closing electrical circuit and a cylinder having a helicoidal contact strip or abutment adapted to be engaged by a projection from the key-bar to stop the rotation of the type-wheel at a predetermined point.

12. The combination with a type-wheel and electrical means for turning said wheel, shifting it axially and swinging it laterally, of a key-lever for closing the electrical circuit and a cylinder having a helicoidal contact strip or abutment adapted to be engaged by a projection from the key-bar to stop the rotation of the type-wheel at a predetermined point and gearing for communicating rotary motion to the type-wheel and cylinder.

13. In a type-writer, the combination with a printing-roller, and a type-wheel, of an electromagnet for vibrating the type-wheel to cause the imprint of the character thereon upon the paper on the roller, key-levers for energizing said magnets, means for rotating the type-wheel, and rotary stop mechanism engaged by the key-levers.

14. In a type-writer, the combination with a printing-roller, a pivoted frame, a shaft revolubly supported by the frame and carrying a type-wheel, and an armature connected with said frame, of an electromagnet, and key-levers for energizing the magnet and attracting the armature to cause the type-wheel to imprint the proper character upon the paper on the roller.

15. In a type-writer, the combination with a type-wheel, printing-roller, and key-levers, of a rotary stop mechanism adapted to be actuated by and connected in electric circuit with the keys, and mechanism connected with this stop mechanism for rotating the key-wheel to a predetermined position determined by the stopping-point of the rotary stop mechanism.

16. In a type-writer, the combination with a type-wheel, printing-roller, and key-levers, of a rotary stop mechanism adapted to be actuated by and connected in electric circuit with the keys, mechanism connected with this stop mechanism for rotating the key-wheel to a predetermined position determined by the stopping-point of the rotary stop mechanism, and electromagnet energized when the rotary stop mechanism ceases its movement to vibrate the key-wheel to cause the imprint of the proper character upon the paper on the roller.

17. In an electric machine, the combination of the following elements which operate in turn as a result of a single motion of a key-lever, to wit, a type-carrier revolubly and slidingly mounted and laterally vibratable, a rotary stop for checking the type-carrier at the desired character and electric devices for insuring these actions of the type-carrier and stop in proper order in response to a single movement of the type-lever.

In testimony whereof I have signed my name to this specification in the presence of two subscribing witnesses.

GEORGE H. ENNIS.

Witnesses:
J. DON ENNIS,
JESSIE D. ENNIS.